(12) United States Patent
Miyako et al.

(10) Patent No.: US 6,818,304 B2
(45) Date of Patent: Nov. 16, 2004

(54) OPTICAL FILM

(75) Inventors: Takeomi Miyako, Chiba (JP); Hirotoshi Terui, Chiba (JP); Fumiko Kawasato, Chiba (JP); Ken Moriwaki, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 124 days.

(21) Appl. No.: 10/235,487

(22) Filed: Sep. 6, 2002

(65) Prior Publication Data

US 2003/0071248 A1 Apr. 17, 2003

(30) Foreign Application Priority Data

Sep. 6, 2001 (JP) ........................................ 2001-270456

(51) Int. Cl.$^7$ .......................... B32B 27/20; B32B 27/32; B32B 27/36
(52) U.S. Cl. ........................ 428/412; 428/480; 428/523; 524/89; 524/186; 524/358
(58) Field of Search ................................ 428/412, 480, 428/523, 411.1; 252/582; 524/89, 186, 358

(56) References Cited

U.S. PATENT DOCUMENTS

| | | | |
|---|---|---|---|
| 5,804,102 A | 9/1998 | Oi et al. | 252/587 |
| 5,834,122 A | 11/1998 | Teng et al. | 428/412 |
| 6,165,546 A | 12/2000 | Teng et al. | 427/163.1 |
| 6,225,031 B1 | 5/2001 | Appelt et al. | 430/315 |
| 6,229,252 B1 | 5/2001 | Teng et al. | 313/112 |
| 6,255,031 B1 * | 7/2001 | Yao et al. | 430/270.1 |
| 6,344,710 B2 | 2/2002 | Teng et al. | 313/479 |
| 6,452,331 B1 | 9/2002 | Sakurada et al. | 313/582 |

FOREIGN PATENT DOCUMENTS

| | | |
|---|---|---|
| EP | 0 813 220 A1 | 12/1997 |
| EP | 1 090 910 | 4/2001 |
| WO | WO 01/44840 | 6/2001 |

* cited by examiner

Primary Examiner—Ramsey Zacharia
(74) Attorney, Agent, or Firm—Oblon, Spivak, McClelland, Maier & Neustadt, P.C.

(57) ABSTRACT

An optical film having a layer made of a transparent resin containing an anthraquinone type colorant and a diimmonium type colorant.

17 Claims, No Drawings

OPTICAL FILM

The present invention relates to an optical film having both near infrared ray absorption property and color tone correcting property. Particularly, it relates to an optical film useful for an optical filter installed on the front (viewer's side) of a plasma display panel.

The principle of the plasma display panel (hereinafter referred to as PDP) is that a voltage is applied to a rare gas (such as helium, neon, argon or xenon) sealed between two sheets of plate glass, and ultraviolet rays generated at that time are applied to an emitter to generate visible light. From PDP, e.g. near infrared rays and electromagnetic waves radiate in addition to visible light. The near infrared rays may cause production of improper operating signals for near infrared ray remote-controls for home electric appliances such as home televisions, air conditioners and video players, or may have a bad influence over data transfer of e.g. POS (point-of-sale) system.

Accordingly, a method of using an optical film which shuts out near infrared rays having a wavelength of from 850 to 1,100 nm as an optical filter has been proposed as follows. For example, a plurality of metal oxide thin films or metal thin films are laminated on a transparent substrate by e.g. sputtering, and light in the near infrared region is reflected thereon and shut out, while the visible light is transmitted therethrough. However, in order to obtain a high degree of antireflection property, the lamination number has to be increased, thus increasing the number of steps, and the productivity tends to be significantly poor. Further, in a case where the film has to be formed in a large area, highly precise uniformity in the plane is required with the above optical thin film type material, whereby production tends to be difficult.

As functions further required, correction of the object color, balance correction of the display color and adjustment of the transmitted light may, for example, be mentioned. Accordingly, it has been proposed to separately provide an optical film comprising a transparent resin and a color tone correcting colorant which selectively absorbs visible light having a specific wavelength contained in the transparent resin (JP-A-2001-133624), however, the number of steps increases, and the productivity tends to be poor, such being unfavorable.

Accordingly, an optical film wherein a near infrared ray reflection colorant and a color tone correcting colorant are contained in a transparent resin in one layer has been proposed (JP-A-9-316115), however, it tends to be difficult to adjust optical properties since the transmittance is low. Further, since a coating having fine particles dispersed therein is used, coating conditions are limited, such being problematic in view of productivity.

Under these circumstances, the present invention has been made to overcome the above problems of prior art, and it is an object of the present invention to provide an optical film useful for e.g. an optical filter for a display device such as PDP, having high near infrared ray absorption property and color tone correcting property by itself, and excellent in practical durability and production stability.

The present invention provides an optical film having a layer made of a transparent resin containing an anthraquinone type colorant of the formula (1) or (2) and a diimmonium type colorant of the formula (3):

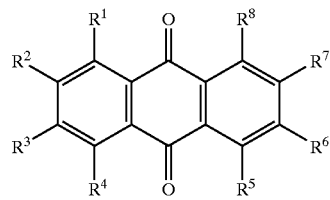

(1)

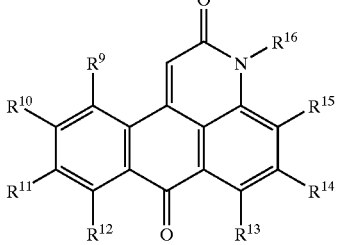

(2)

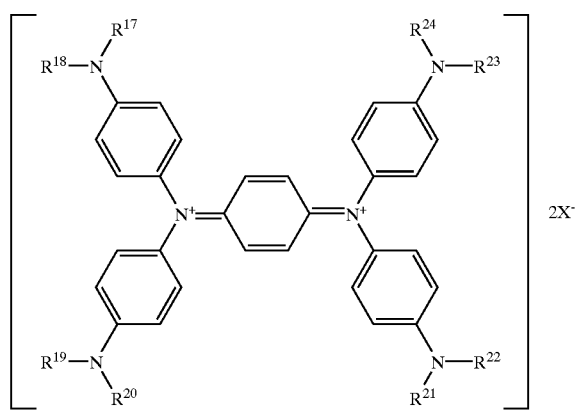

(3)

where, in the formulae (1) and (2), each of $R^1$ to $R^{15}$ which are independent of one another, represents a hydrogen atom, an alkyl group which may have a substituent (excluding a halogenated alkyl group), an alkoxy group, an aryloxy group, a halogen atom, an alkoxycarbonyl group, a halogenated alkyl group, an alkylthio group, an arylthio group, a cyano group, a nitro group, an amino group, an alkylamino group, an amide group, an acyloxy group, a hydroxyl group, a sulfo group or a carboxyl group. In the formula (2), $R^{16}$ represents a hydrogen atom or an alkyl group which may have a substituent. In the formula (3), each of $R^{17}$ to $R^{24}$ which are independent of one another, represent a hydrogen atom, an alkyl group which may have a substituent, an alkenyl group which may have a substituent, an aryl group which may have a substituent, or an alkynyl group which may have a substituent, and $X^-$ is an anion.

Now, the present invention will be explained in detail with reference to the preferred embodiments.

The optical film of the present invention is an optical film having a layer made of a transparent resin containing an anthraquinone type colorant and a diimmonium type colorant.

The anthraquinone type colorant is represented by the above formula (1) or (2). In the formulae (1) and (2), each of $R^1$ to $R^{15}$ which are independent of one another, represents a hydrogen atom, an alkyl group which may have a substituent (excluding a halogenated alkyl group), an alkoxy group, an aryloxy group, a halogen atom, an alkoxycarbonyl group, a halogenated alkyl group, an alkylthio group, an arylthio group, a cyano group, a nitro group, an amino group, an alkylamino group, an amide group, an acyloxy group, a hydroxyl group, a sulfo group or a carboxyl group.

In the formula (2), $R^{16}$ represents a hydrogen atom or an alkyl group which may have a substituent.

In each of the above formulae (1) and (2), the alkyl group may, for example, be a methyl group, an ethyl group, a n-propyl group, an iso-propyl group, a n-butyl group, a sec-butyl group, an iso-butyl group, a tert-butyl group, a n-amyl group, a tert-amyl group, a n-hexyl group, a n-octyl group or a tert-octyl group. The alkyl group may have a substituent such as an alkoxycarbonyl group, a hydroxyl group, a sulfo group or a carboxyl group.

The alkoxy group may, for example, be a methoxy group or an ethoxy group, and the aryloxy group may, for example, be a phenoxy group or a p-chlorophenoxy group. Further, the alkoxycarbonyl group may, for example, be a methoxycarbonyl group or an ethoxycarbonyl group, the halogenated alkyl group may, for example, be a trifluoromethyl group or a pentafluoroethyl group, the alkylthio group may, for example, be a methylthio group, an ethylthio group, a propylthio group or a butylthio group, the arylthio group may, for example, be a phenylthio group or an o-carboxylphenylthio group, the alkylamino group may, for example, be a methylamino group or an ethylamino group, the amide group may, for example, be an acetoamide group or a propionamide group, and the acyloxy group may, for example, be an acetoxy group or a butyryloxy group.

The anthraquinone type colorant in the present invention is preferably one having a maximum absorption in the visible light region with a wavelength of from 400 to 700 nm.

The diimmonium type colorant is represented by the above formula (3).

In the formula (3), each of $R^{17}$ to $R^{24}$ which are independent of one another, represents a hydrogen atom, an alkyl group which may have a substituent, an alkenyl group which may have a substituent, an aryl group which may have a substituent or an alkynyl group which may have a substituent.

The alkyl group may be the alkyl group as described above. The alkyl group may have a substituent such as an alkoxycarbonyl group, a hydroxyl group, a sulfo group or a carboxyl group.

The alkenyl group may, for example, be a vinyl group, a propenyl group, a butenyl group, a pentenyl group, a hexenyl group, a heptenyl group or an octenyl group. The alkenyl group may have a substituent such as a hydroxyl group or a carboxy group.

The aryl group may, for example, be a benzyl group, a p-chloropentyl group, a p-methylbenzyl group, a 2-phenylmethyl group, a 2-phenylpropyl group, a 3-phenylpropyl group, an α-naphthylmethyl group or a β-naphthylethyl group. The aryl group may have a substituent such as a hydroxyl group or a carboxy group.

The alkynyl group may, for example, be a propynyl group, a butynyl group, a 2-chlorobutynyl group, a pentynyl group or a hexynyl group. The alkynyl group may have a substituent such as a hydroxyl group or a carboxy group.

$X^-$ represents an anion such as a chlorine ion, a bromine ion, an iodine ion, a perchloride ion, a periodide ion, a nitrate ion, a benzenesulfonate ion, a p-toluenesulfonate ion, a methylsulfate ion, an ethylsulfate ion, a propylsulfate ion, a tetrafluoroborate ion, a tetraphenylborate ion, a hexafluorophosphate ion, a benzenesulfinate ion, an acetate ion, a trifluoroacetate ion, a propioneacetate ion, a benzoate ion, an oxalate ion, a succinate ion, a malonate ion, an oleate ion, a stearate ion, a citrate ion, a monohydrogen diphosphate ion, a dihydrogen monophosphate ion, a pentachlorostannate ion, a chlorosulfonate ion, a fluorosulfonate ion, a trifluoromethanesulfonate ion, a hexafluoroarsenate ion, a hexafluoroantimonate ion, a molybdate ion, a tungstate ion, a titanate ion or a zirconate ion.

Among these anions, preferred are e.g. a perchloride ion, an iodide ion, a tetrafluoroborate ion, a hexafluorophosphate ion, a hexafluoroantimonate ion and a trifluoromethanesulfonate ion, and hexafluoroantimonate ion which the most excellent heat stability is particularly preferred.

The diimmonium type colorant of the present invention preferably has a molar absorptivity ε in the vicinity of 1,000 nm of from about 80,000 to about 100,000. Further, it is preferred to use a diimmonium type colorant having a purity of at least 98% or a diimmonium type colorant having a melting point of at least 210° C., in order to suppress deterioration of the optical film at the time of processing and to impart practical durability after formation of the optical film. It is particularly preferred to use a diimmonium type colorant having a purity of at least 98% and having a melting point of at least 210° C.

Further, at least one type of near infrared ray absorbing colorants having a maximum absorption wavelength of from 850 to 1,100 nm and color tone correcting colorants having a maximum absorption wavelength of from 300 to 800 nm may be added. Such near infrared absorbing colorant and color tone correcting colorant may, for example, be a general colorant such as an inorganic type pigment, an organic type pigment or an organic type dye.

The inorganic type pigment may, for example, be a cobalt type colorant, an iron type colorant, a chromium type colorant, a titanium type colorant, a vanadium type colorant, a zirconium type colorant, a molybdenum type colorant, a ruthenium type colorant, a platinum type colorant, an ITO type colorant or an ATO type colorant, and the organic type pigment and the organic type dye may, for example, be an aminium type colorant, a cyanine type colorant, a merocyanine type colorant, a croconium type colorant, a squaleum type colorant, an azulenium type colorant, a polymethine type colorant, a naphthoquinone type colorant, a pyrylium type colorant, a phthalocyanine type colorant, a naphthalocyanine type colorant, a naphtholactam type colorant, an azo type colorant, a condensed azo type colorant, an indigo type colorant, a perinone type colorant, a perylene type colorant, a dioxazine type colorant, a quinacridone type colorant, an isoindolinone type colorant, a quinophthalone type colorant, a pyrrole type colorant, a thioindigo type colorant, a metal complex type colorant, a dithiol metal complex type colorant, an indolephenol type colorant or a triallylmethane type colorant. Among them, preferred are e.g. a metal complex type colorant, an aminium type colorant, a phtnalocyanine type colorant, a naphthalocyanine type colorant and a pyrrole type colorant.

Further, in a case where a salt compound or a metal complex salt containing an anion is selected, the same anion as the anion in the diimmonium type colorant is particularly preferably contained. When the same anion is contained, the diimmonium type colorant will not change even if a salt exchange reaction with the anion of the diimmonium type colorant takes place, and accordingly absorption property, heat stability, etc. may not change.

As the content of the colorant, the total content of the colorants is preferably within a range of from 0.1 to 10.0 mass % based on the total amount of the transparent resin solid content and all the colorants. When it is at least 0.1 mass %, adequate color tone correcting property and near infrared ray absorption property can be obtained, and when it is at most 10.0 mass %, interaction between the colorants can be suppressed, and the stability of the colorant tends to be good. From such viewpoints, it is particularly preferably from 1.0 to 9.0 mass %.

In general, such an optical film preferably has an achromatic color, and the chromaticity coordinates of an illuminant C calculated in accordance with JIS Z8701-1999, corresponding thereto, are such that (x, y)=(0.310, 0.316), and accordingly it is preferred to optionally select the type and the content of the colorant in order that (x, y)=(0.310±0.100, 0.316±0.100). Further, it is preferred that the luminous average transmittance is at least 45%, and it is particularly preferred that the definition of the chromaticity coordinates (x, y) and the definition of the luminous average transmittance are simultaneously satisfied.

The transparent resin of the present invention preferably has a glass transition temperature of from 90 to 180° C., particularly preferably from 120 to 180° C., whereby practical durability can be maintained, molding can easily be carried out, and deterioration of the colorant at the time of molding can be suppressed. As a preferred transparent resin, a thermoplastic resin such as a polyester type resin, a polyolefin type resin, a polycycloolefin type resin or a polycarbonate type resin may be mentioned. As such a resin, a commercially available product such as a polyester resin "O-PET", tradename, manufactured by Kanebo Ltd., a polyolefin type resin "ARTON", tradename, manufactured by JSR Corporation, a polycycloolefin type resin "ZEONEX", tradename, manufactured by ZEON Corporation or a polycarbonate type resin "Iupilon", tradename, manufactured by Mitsubishi Engineering-Plastics Corporation, may be used.

As an organic solvent to dissolve the transparent resin, an alcohol such as methanol, ethanol, isopropyl alcohol, diacetone alcohol, ethyl cellosolve or methyl cellosolve, a ketone such as acetone, methyl ethyl ketone, cyclopentane or cyclohexanone, an amide such as N,N-dimethylformamide or N,N-dimethylacetoamide, a sulfoxide such as dimethylsulfoxide, an ether such as tetrahydrofuran, dioxane or ethylene glycol monomethyl ether, an ester such as methyl acetate, ethyl acetate or butyl acetate, an aliphatic halogenated hydrocarbon such as chloroform, methylene chloride, dichloroethylene, carbon tetrachloride or trichloroethylene, an aromatic compound such as benzene, toluene, xylene, monochlorobenzene or dichlorobenzene, an aliphatic hydrocarbon such as n-hexane or cyclohexanoligroin, or a fluorine-containing solvent such as tetrafluoropropyl alcohol or pentafluoropropyl alcohol.

The layer made of the transparent resin containing a colorant may be produced by using a coating method such as a dip coating method, a spray coating method, a spinner coating method, a bead coating method, a wire bar coating method, a blade coating method, a roller coating method, a curtain coating method, a slit die coater method, a gravure coater method, a slit reverse coater method, a microgravure method or a comma coater method.

The thickness of the layer made of the transparent resin is preferably from 0.3 to 50.0 μm. When it is at least 0.3 μm, adequate color tone correcting property and near infrared ray absorption property can be obtained, and when it is at most 50 μm, the remaining solvent at the time of molding can be decreased. From these viewpoints, the thickness is particularly preferably from 0.5 to 20.0 μm. In the layer made of the transparent resin of the present invention, a leveling agent, an antistatic agent, a heat stabilizer, an antioxidant, a dispersant, a flame retardant, a lubricant, a plasticizer or an ultraviolet ray absorbent may, for example, be contained.

Further, the optical film of the present invention may have at least one layer having a function other than that of the layer made of the transparent resin containing a colorant. For example, an ultraviolet ray absorption layer to prevent deterioration of the colorant due to ultraviolet rays to improve light resistance, an antireflection layer to improve visibility of an image, an electromagnetic wave shielding layer to cut electromagnetic waves emitted from a display device such as PDP, a hard coat layer to impart scratch resistance or a layer having a self-healing property, a stainproof layer to prevent stain on the outermost surface, or a pressure-sensitive adhesive or adhesive layer to laminate layers, may be mentioned.

The optical film of the present invention may be formed on a substrate with a releasing surface and then separated, or it may be formed on a transparent substrate film (hereinafter referred to as substrate film) and integrated with the substrate film.

The substrate with a releasing surface may be any film or plate, and the material is not particularly limited. It is preferred to apply a release treatment by using a silicone or a resin having a low surface tension to the surface of the substrate, in order to obtain an excellent release property.

As the material of the substrate film, a polyester such as polyethylene terephthalate (PET) or polybutylene terephthalate (PBT), a polyolefin such as polyethylene or polypropylene, a polyacrylate, a polyacrylate such as polymethylmethacrylate (PMMA), a polycarbonate (PC), a polystyrene, triacetate, polyvinyl alcohol, polymethyl chloride, polyvinylidene chloride, an ethylene/vinyl acetate copolymer, polyvinyl butyral, a polyurethane, cellophane, etc. may optionally be selected, and preferred are PET, PC and PMMA.

The thickness of the substrate film is preferably from 10 to 500 μm, whereby the workability tends to be good, and the haze value can be suppressed low. Further, it is preferred to apply a corona treatment or an easily-adhesive treatment to the surface of the substrate film before the optical film is formed on the substrate film.

The optical film of the present invention can easily be bonded to a transparent substrate having a high rigidity (hereinafter referred to as transparent substrate) by means of an adhesive layer, either when the film is separated from the substrate with a releasing surface or when it is integrated with the substrate film. As the material of the transparent substrate, glass or a transparent and high rigidity high molecular weight material may optionally be selected, however, preferred are e.g. glass, tempered or semi-tempered glass, polycarbonate and polyacrylate. When the optical film bonded to the transparent substrate is used as an optical filter, a function as a protective plate for a display device such as PDP may also be obtained.

As the adhesive, a commercially available adhesive may be used, however, specific examples of the preferred adhesive include adhesives such as an acrylate copolymer, polyvinyl chloride, an epoxy resin, polyurethane, a vinyl acetate copolymer, a styrene-acryl copolymer, polyester, polyamide, polyolefin, a styrene-butadiene copolymer type rubber, butyl rubber and a silicone resin. Further, in a case where an adhesive layer is laminated, a release film of e.g. PET, the adhesive surface of which is coated with silicone, is preferably bonded in view of workability. In the case where an adhesive is used, additives having various functions such as an ultraviolet ray absorbent may be added to the adhesive.

The optical film of the present invention or the optical film bonded to the transparent substrate is useful as an optical filter for a flat display device such as PDP, a plasma address liquid crystal (PALC) display panel or a field emission display (FED) panel or for a display device such as a cathode ray tube display device (CRT). In such a case, the optical film is installed on the viewer's side of the display device, and it may be installed with a distance from the display device, or it may be directly bonded to the surface of the display device. The optical film of the present invention has high near infrared ray absorption property and color tone correcting property, and is excellent in durability as well, and accordingly it is particularly useful for an optical filter for e.g. PDP which generates near infrared rays.

Now, the present invention will be explained in further detail with reference to Examples. However, it should be understood that the present invention is by no means restricted to such specific Examples.

Examples 1 to 4 are Examples of the present invention, and Examples 5 to 8 are Comparative Examples. Design was attempted in order that the transmittance would be at most 15% at a wavelength of from 850 to 1,100 nm in the near infrared region, and the luminous average transmittance would be at least 45% and the chromaticity coordinates of an illuminant C would be (0.310, 0.316) in the visible region. Methods for measuring the optical properties and the method for evaluating the durability of samples of optical films obtained in Examples and Comparative Examples are as follows.

Transmittance

Using a spectrophotometer (UV-3100, manufactured by Shimadzu Corporation), a spectrum of a test specimen in a square of 20×20 mm cut out from each sample was measured within a range of from 380 to 1,300 nm. The luminous average transmittance Y and chromaticity coordinates (x,y) were calculated in accordance with JIS Z8701-1999. Transmittances at 850 nm, 900 nm and 1,100 nm were taken as T850, T900 and T1100. These values were obtained by taking the transmittance of the room air as a control.

Evaluation of Moisture Resistance

Using a constant temperature and constant humidity testing apparatus (KCH-1000, manufactured by TOKYO RIKAKIKAI Co., Ltd.), the temperature was set at 60° C. and the humidity was set at 95% RH, and measured values Y, x and y of each sample after the test for 1,000 hours were compared with the measured values before the test. The evaluation standards are such that the change of the measured values before and after the test was less than 3% with respect to all the measured items, Δ: the change was at least 3% and less than 5% with respect to at least one measured item, and X: the change was at least 5% with respect to at least one measured item.

Evaluation of Heat Resistance

Using a fixed temperature and constant temperature apparatus (manufactured by TOKYO RIKAKIKAI Co., Ltd.), the temperature was set at 80° C., and measured values Y, x and y of each sample after the test for 1,000 hours were compared with the measured values before the test. The evaluation standards are such that ○: the change of the measured values before and after the test was less than 3% with respect to all the measured items, Δ: the change was at least 3% and less than 5% with respect to at least one measured item and X : the change was at least 5% with respect to at least one measured item.

EXAMPLE 1

A transparent polyester resin having a glass transition temperature of 125° C. ("O-PET", tradename, manufactured by Kanebo Ltd.) was dissolved in a cyclopentanone/toluene (6/4 volume ratio) mixed solvent so that it became 15 mass % to obtain a main component solution. 8.0 Mass % of a diimmonium type colorant (N,N,N',N'-tetrakis(p-di-tert-butylaminophenyl)-p-phenylenediamine.dihexafluoroatimonate imonium salt), 0.4 mass % of an anthraquinone type colorant ("FILESTER Blue TRR", tradename, manufactured by Ciba Specialty Chemicals) and 0.2 mass % of an anthraquinone type colorant ("FILESTER violet BA", tradename, manufactured by Ciba Specialty Chemicals), based on the total amount of the resin content in the main component solution and all the colorants, were added to the main component solution, to obtain a coating solution having these components dissolved therein. A polyethylene terephthalate film having a thickness of 100 μm was coated with this coating solution by means of microgravure so that the thickness of the dried coating film would be 6 μm to obtain an optical film.

EXAMPLE 2

An optical film was obtained in the same manner as in Example 1 except that a transparent olefin resin having a glass transition temperature of 171° C. ("ARTON", tradename, manufactured by JSR Corporation) was used instead of the transparent polyester resin used in Example 1.

EXAMPLE 3

An optical film was obtained in the same manner as in Example 1 except that 0.1 mass % of an aminium type colorant having hexafluoroantimonate as an anion ("NIR-AM2", tradename, manufactured by Nagase ChemteX Corporation) was further used in addition to the colorants used in Example 1.

EXAMPLE 4

An optical film was obtained in the same manner as in Example 1 except that 8.0 mass % of a diimmonium type colorant (N,N,N',N'-tetrakis(p-di-tert-butylaminophenyl)-p-phenylenediamine.dehexafluoroantimonate imonium salt), 0.1 mass % of an anthraquinone type colorant ("FILESTER Blue TRR", tradename, manufactured by Ciba Specialty Chemicals) and 0.3 mass % of a cyanine type colorant ("FD-3351", tradename, manufactured by Asahi Denka Kogyo K. K.) having a perchloride ion as an anion were used instead of the colorants used in Example 1.

EXAMPLE 5

An optical film was obtained in the same manner as in Example 1 except that 16.0 mass % of a diimmonium type colorant (N,N,N',N'-tetrakis(p-di-tert-butylaminophenyl)-p-phenylenediamine.dihexafluoroantimonate imonium salt) and 0.6 mass % of a cyanine type colorant ("FD-3351", tradename, manufactured by Asahi Denka Kogyo K. K.) were used instead of the colorants used in Example 1, and the thickness of the dried coating film was 3 μm.

EXAMPLE 6

An optical film was obtained in the same manner as in Example 1 except that 7.3 mass % of a phthalocyanine type colorant ("YKR-3080", tradename, manufactured by Yamamoto Chemicals, Inc.), 0.9 mass % of a metal complex type colorant ("VALIFAST RED 3304", tradename, manufactured by Orient Kagaku Kogyo K. K.) and 0.4 mass % of a phthalocyanine type colorant ("ORASOL BLUE GL", tradename, manufactured by Ciba Specialty Chemicals) were used instead of the colorants used in Example 1. In the initial optical evaluation of this film, the value Y was outside the aimed value and was 23.6%.

EXAMPLE 7

An optical film was obtained in the same manner as in Example 1 except that 3.3 mass % of a phthalocyanine type colorant ("YKR-3080", tradename, manufactured by Yamamoto Chemicals, Inc.), 0.5 mass % of a metal complex type colorant ("VALIFAST RED 3304", tradename, manufactured by Orient Kagaku Kogyo K. K.) and 0.3 mass % of a phthalocyanine type colorant ("ORASOL BLUE GL", tradename, manufactured by Ciba Specialty Chemicals) were used instead of the colorants used in Example 1. In the initial optical evaluation of this film, the values T850, T900 and T1100 were outside the aimed values, and were 37.7%, 29.7% and 23.7%, respectively.

EXAMPLE 8

An optical film was obtained in the same manner as in Example 1 except that 6.6 mass % of a phthalocyanine type colorant ("YKR-3080", tradename, manufactured by Yamamoto Chemicals, Inc.) was used instead of the colorants used in Example 1. In the initial optical evaluation of this film, the chromaticity value y was outside the aimed value and was 0.352.

Evaluation Results

It was found from the above results that each of the optical films of Examples 1 to 3 has high near infrared ray absorption property and color tone correcting property as initial properties. Further, with respect to each of the optical films of Examples 1 to 3, the change of each optical property after each durability test was less than 3%, and accordingly it was confirmed that an optical film excellent in durability can be obtained according to the present invention. With respect to the optical film of Example 4, the initial properties and durability are slightly poor but satisfactory. Whereas, with respect to the optical film of Example 5, the initial properties are poor, and particularly optical properties after moisture resistance and heat resistance tests were poor, such being problematic practically. The optical films of Examples 6 to 8 are excellent in durability, however, they can not satisfy both the near infrared ray absorption property and the color tone correcting property, such being problematic practically.

TABLE 1

|  | Y | x | y | T850 | T900 | T-1100 | Moisture resistance | Heat resistance |
|---|---|---|---|---|---|---|---|---|
| Ex. 1 | 59.0 | 0.310 | 0.316 | 12.5 | 2.1 | 0.1 | ○ | ○ |
| Ex. 2 | 59.1 | 0.311 | 0.316 | 12.7 | 2.2 | 0.2 | ○ | ○ |
| Ex. 3 | 58.5 | 0.312 | 0.317 | 11.7 | 1.6 | 0.1 | ○ | ○ |
| Ex. 4 | 62.0 | 0.309 | 0.315 | 14.0 | 4.2 | 0.3 | Δ | Δ |
| Ex. 5 | 65.4 | 0.313 | 0.319 | 18.2 | 5.3 | 0.6 | X | X |
| Ex. 6 | 23.6 | 0.312 | 0.317 | 13.5 | 7.9 | 4.8 | ○ | ○ |
| Ex. 7 | 46.1 | 0.311 | 0.314 | 37.7 | 29.7 | 23.7 | ○ | ○ |
| Ex. 8 | 45.2 | 0.310 | 0.352 | 15.0 | 9.8 | 6.3 | ○ | ○ |

According to the present invention, an optical film having high near infrared ray absorption property and color tone correcting property can be provided. Further, an optical film excellent in stability of performance i.e. practical durability, and excellent in productivity, can be provided. According to the above excellent physical properties, an optical film particularly useful for an optical filter such as PDP can be provided.

The entire disclosure of Japanese Patent Application No. 2001-270456 filed on Sep. 6, 2001 including specification, claims and summary are incorporated herein by reference in its entirety.

What is claimed is:

1. An optical film having a layer made of a transparent resin containing an anthraquinone colorant of formula (1) or (2) and a diimmonium type colorant of the formula (3):

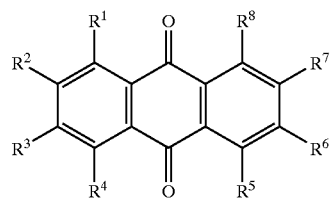

(1)

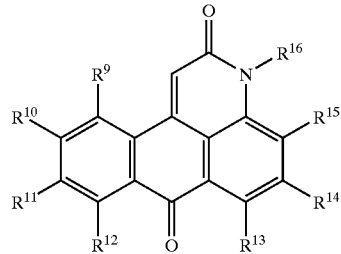

(2)

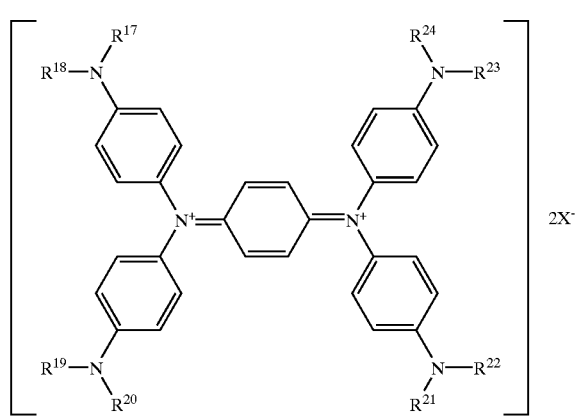

(3)

wherein the formulae (1) and (2), each of $R^1$ to $R^{15}$ which are independent of one another, represents a hydrogen atom, an alkyl group which may have a substituent excluding a halogenated alkyl group, an alkoxy group, an aryloxy group, a halogen atom, an alkoxycarbonyl group, a halogenated alkyl group, an alkylthio group, an arylthio group, a cyano group, a nitro group, an amino group, an alkylamino group, an amide group, an acyloxy group, a hydroxyl group, a sulfo group or a carboxyl group, wherein the formula (2), $R^{16}$ represents a hydrogen atom or an alkyl group which may have a substituent, and wherein formula (3), each of $R^{17}$ to $R^{24}$ which are independent of one another, represents a hydrogen atom, an alkyl group which may have a substituent, an alkenyl group which may have a substituent, an aryl group which may have a substituent, or an alkynyl group which may have a substituent, and $X^-$ is an anion.

2. The optical film according to claim 1, wherein the transparent resin further contains at least one colorant comprising a salt compound having the same anion as the anion in the diimmonium type colorant of the formula (3) excluding the diimmonium colorant of formula (3).

3. The optical film according to claim 1, wherein the transparent resin has a glass transition temperature of from 90 to 180° C.

4. The optical film according to claim 2, wherein the transparent resin has a glass transition temperature of from 90 to 180° C.

5. The optical film of claim 1, wherein formula (3) $X^-$ is at least one selected from the group consisting of a perchloride ion, an iodide ion, a tetrafluoroborate ion, a hexafluorophosphate ion, a hexafluoroantimonate ion, and a trifluoromethanesulfonate ion.

6. The optical film of claim 1, wherein formula (3) $X^-$ is a hexafluoroantimonate ion.

7. The optical film of claim 1, wherein the total amount of all colorants is from 0.1 to 10 mass percent based on the total amount of the transparent resin solid content and all colorants.

8. The optical film of claim 1, wherein the transparent resin is at least one selected from the group consisting of a polyester resin, a polyolefin resin, a polycyclolefin resin, and a polycarbonate resin.

9. The optical film of claim 1, wherein the layer made of a transparent resin has a thickness of 0.3 to 50.0 μm.

10. The optical film of claim 1, wherein the layer made of a transparent resin has a thickness of from 0.5 to 20 μm.

11. The optical film of claim 1, wherein the layer made of a transparent resin further comprises at least one selected from the group consisting of a leveling agent, an antistatic agent, a heat stabilizer, an antioxidant, a dispersant, a flame retardant, a lubricant, a plasticizer and an ultraviolet ray absorbent.

12. The optical film of claim 1, comprising N,N,N',N'-tetrakis(p-di-tert-butylaminophenyl)-p-phenylenediamine.dihexafluoroantimonate immonium salt.

13. The optical film of claim 12, further comprising a cyanine colorant.

14. The optical film of claim 1, wherein the transparent layer comprises a polyester resin.

15. The optical film of claim 1, further comprising at least one infrared ray absorbing colorant.

16. A substrate coated with the film of claim 1.

17. The substrate of claim 16, wherein the substrate is transparent.

* * * * *